United States Patent [19]
Matsuura et al.

[11] Patent Number: 5,426,356
[45] Date of Patent: Jun. 20, 1995

[54] NON-CONTACT PROFILE CONTROL METHOD

[75] Inventors: Hitoshi Matsuura, Hachioji; Eiji Matsumoto, Oshino, both of Japan

[73] Assignee: Fanuc Ltd., Minamitsuru, Japan

[21] Appl. No.: 30,417

[22] PCT Filed: Jul. 24, 1992

[86] PCT No.: PCT/JP92/00950

§ 371 Date: Mar. 23, 1993

§ 102(e) Date: Mar. 23, 1993

[87] PCT Pub. No.: WO93/02832

PCT Pub. Date: Feb. 18, 1993

[30] Foreign Application Priority Data

Jul. 26, 1991 [JP] Japan ................... 3-208814

[51] Int. Cl.⁶ ........................... B23Q 35/127
[52] U.S. Cl. ..................... 318/578; 318/577; 318/572; 364/474.03; 364/474.37
[58] Field of Search ............... 318/560–646; 364/474.01–474.32; 356/376, 375

[56] References Cited

U.S. PATENT DOCUMENTS

| | | | |
|---|---|---|---|
| 4,266,172 | 5/1981 | Yamazaki | 318/578 |
| 4,357,664 | 11/1982 | Imazeki et al. | 318/571 |
| 4,453,084 | 6/1984 | Brouwer | 318/577 X |
| 4,630,215 | 12/1986 | Graham, Jr. | 318/578 X |
| 4,724,301 | 2/1988 | Shibata et al. | 318/577 X |
| 4,949,024 | 8/1990 | Matsuura | 318/567 |
| 5,243,265 | 9/1993 | Matsuura et al. | 318/578 |
| 5,247,233 | 9/1993 | Matsuura et al. | 318/570 |

FOREIGN PATENT DOCUMENTS

| | | |
|---|---|---|
| 1-109058 | 4/1989 | Japan . |
| 1-153253 | 6/1989 | Japan . |
| 1-188254 | 7/1989 | Japan . |
| 3-60956 | 3/1991 | Japan . |
| 3-121754 | 5/1991 | Japan . |

Primary Examiner—Paul Ip
Attorney, Agent, or Firm—Staas & Halsey

[57] ABSTRACT

A non-contact profile control method capable of being effectively applied to a model whose contour has an irregularity such as a step-like contour. A non-contact distance sensor generates a dark alarm signal when its measuring beam spot is formed out of its detection area on a model. In response to this dark alarm signal, the profile control is discontinued, and a tracer head, on which the distance sensor is mounted, is rotated until the dark alarm signal is turned off so that the distance sensor can recover its detecting function. Furthermore, an additional rotation is given to the distance sensor by a predetermined amount to stabilize the detecting function of the distance sensor. A work table is shifted with respect to the tracer head so that a clearance between the tracer head and a steep slope of the stepped portion can be adjusted to become closer to a predetermined value, and the profile control is resumed. Thus, the profile control along the steep change on the model surface can be continuously carried out.

11 Claims, 8 Drawing Sheets

NON-CONTACT PROFILE CONTROL METHOD

BACKGROUND OF THE INVENTION

1. Field of the Invention

The present invention relates to a profile control method, wherein a profiling machine, having a non-contact type distance sensor, is used for accurately copying an irregular profile; i.e. the cutting tool is guided by the contour of a model. Particularly, the present invention relates to a profile control method, by which the non-contact type distance sensor can be automatically recovered from a disabled condition when the non-contact type distance sensor has lost its detecting function due to sudden change of the contour of the model during the profile control. Thus, the present invention guarantees the stable execution of the profile control.

2. Description of the Related Art

In a conventional profiling machine, at least one non-contact type distance sensor is mounted on a distal end of the tracer head. A semiconductor laser or light emitting diode (LED) is normally used for this kind of non-contact type distance sensor. With this non-contact type distance sensor, a distance between the tip of the tracer head and the model surface is feedback-controlled to a predetermined value.

However, in this kind of non-contact distance sensor such as an optical sensor, if the model surface inclines largely with respect to a table having the model loaded thereon, an angle of an irradiation beam axis (i.e. a measuring beam axis) coming out of the distance sensor is largely inclined from the perpendicular of the model surface. The resolution of such a distance sensor tends to be adversely lowered because the beam spot formed on the model surface becomes a widely elongated elliptic shape rather than a circle. This results in the deterioration in the accuracy of the profile control.

In order to solve this kind of inconvenience or disadvantage, the applicant of the present invention has already proposed a non-contact profile control apparatus, as disclosed in the Unexamined Japanese Patent Application NO. HEI 1-194500 and the Unexamined Japanese Patent Application NO. HEI 1-328777.

In this non-contact profile control apparatus, a tracer head is provided rotatably about a supporting shaft vertically extending above the table; two sets of optical distance sensors are mounted on the tracer head so that their measuring beams always maintain a predetermined angle with respect to the supporting shaft; the signals obtained from these optical distance sensors are used for obtaining a normal vector of the model surface (a very small plane) irradiated by the measuring beam; and the rotational position of the tracer head is controlled to adjust the direction of the measuring beam as close to the perpendicular of the model surface as possible.

According to the non-contact profile control apparatus, as is proposed above, the distance between the distance sensor and the measuring point on the model surface can always be maintained at a predetermined constant value, and the rotational position of the distance sensor is controlled in such a manner that the measuring beam axis of the distance sensor is always directed as close to the perpendicular of the model surface as possible, thereby making it possible for the cutting operation to be performed accurately through the profile control.

However, if the profile of a model surface to be copied changes radically, the distance between the distance sensor and the model surface will also vary so radically that the distance sensor will sometimes become unable to effectively follow such radical change of the profile.

For example, the measuring beam of the optical distance sensor may deviate out of the detection limit of the optical sensor when the measuring beam passes along a stepped portion formed on the model, or the measuring beam axis of the the distance sensor may suddenly come to have such a largely inclined angle with respect to the model surface that the measuring beam becomes almost parallel with the model surface, thereby causing the beam spot formed on the model surface to become a widely elongated elliptic shape to substantially disable the distance-detection function of the distance sensor and adversely affect the profile control and/or in the rotational position control of the trace head.

DISCLOSURE OF INVENTION

An object of the present invention is to provide a non-contact profile control method, wherein a distance detecting function of a non-contact type distance sensor can be effectively maintained and automatically recovered even when the distance detection function is lost due to a steep or sudden change of the model surface such as stepped portions, so that the present invention provides an accurate and continuously-operable profile control method.

In order to attain the above object, the present invention carries out the non-contact profile control in the following manner: at least one non-contact type distance sensor is mounted rotatably on a supporting shaft extending vertically above a table for loading the model thereon. An angle between the axis of the detection beam of the distance sensor and the supporting shaft is fixed to maintain a predetermined constant value.

When the distance sensor has failed to detect the distance during the non-contact profile control operation, the rotational position control of the distance sensor and the profile control are discontinued once. Then, the distance sensor is forcibly rotated about its vertical supporting shaft so as to be resettled at a position at which distance detecting function can be restored. Preferably, after the distance sensor is relocated at this operable position, the table is shifted with respect to the distance sensor to adjust clearance between the model surface and the distance sensor to become closer to a predetermined regular value. Then, the rotational position control of the distance sensor and the profile control are both restarted.

Furthermore, when rotating the distance sensor about the vertical supporting shaft until the distance sensor recovers its detecting function, it is preferable to rotate the distance sensor one time by a predetermined amount and subsequently rotate it by a predetermined smaller amount at a predetermined interval successively for fine adjustment until the distance sensor recovers its detecting function. When the distance detecting function is restored for the distance sensor, the fine adjustment by rotation is terminated. It is further preferable to give an additional rotation to the distance sensor by another predetermined amount after the distance sensor recovers its detecting function.

Yet further, in order to restore the distance detecting function for the distance sensor by rotating it around the vertical supporting shaft, it is preferable to forcibly rotate the distance sensor for 360-degree revolution. During this one complete revolution, pre-defined first and second angles are measured. Here, the first angle is a boundary at which the distance sensor recovers its function by getting out of a disabling region to a normal region, while the second angle coming after this normal region is another boundary at which the distance sensor again enters from the normal region to a disabling region. The rotational position of the distance sensor is adjusted to resettle at a midpoint between thus defined first and second angles.

Moreover, when shifting the table with respect to the distance sensor, it is preferable to set the shift direction of the table to be parallel to the direction of the measuring beam of the distance sensor projected on the table shifting plane.

Preferably, the distance sensor utilized in the present invention can be a distance detector that measures reflected light quantity, an optical distance detector that utilizes the triangular distance measuring method, an eddy-current type distance detector, or a supersonic type distance detector.

It is further preferable that the distance sensor consists of a first distance sensor for obtaining the predetermined regular clearance and a second distance sensor for cooperating with the first distance sensor to detect the inclination of the model surface. During the profile control, the rotational position of the distance sensor is adjusted in response to the detected inclination of the model surface.

In accordance with the present invention, as is described in the foregoing description, the profile control is discontinued once when the beam spot of the non-contact type distance sensor is formed on the model surface out of the detection area of this distance sensor, whereby the tracer head will rotate around its rotational shaft until the distance sensor recovers its detecting function to resume the profile control. Thus, even if the distance sensor temporarily loses its detecting function due to, for example, a stepped portion formed on the model surface, the present invention makes it possible to automatically recover the detecting function of the distance sensor so that an adequate profile control can be continuously performed.

BRIEF DESCRIPTION OF DRAWINGS

FIG. 7 is a flowchart showing the processing to be carried out on the control apparatus shown in FIG. 1 for recovering the detecting function of the distance sensor; in accordance with the preferred embodiment and FIG. 8(a)–FIG. 8(e) and FIG. 8(a')–FIG. 8(e') are view showing the operations of the control apparatus shown in FIG. 1 to be carried out for recovering the detecting function of the distance sensor, wherein FIG. 8(a)–FIG. 8(e) show a side view and FIG. 8(a')–FIG. 8(e') show a plane view based on a visual field of the light-receiving element.

DESCRIPTION OF THE PREFERRED EMBODIMENTS

Figure 1:
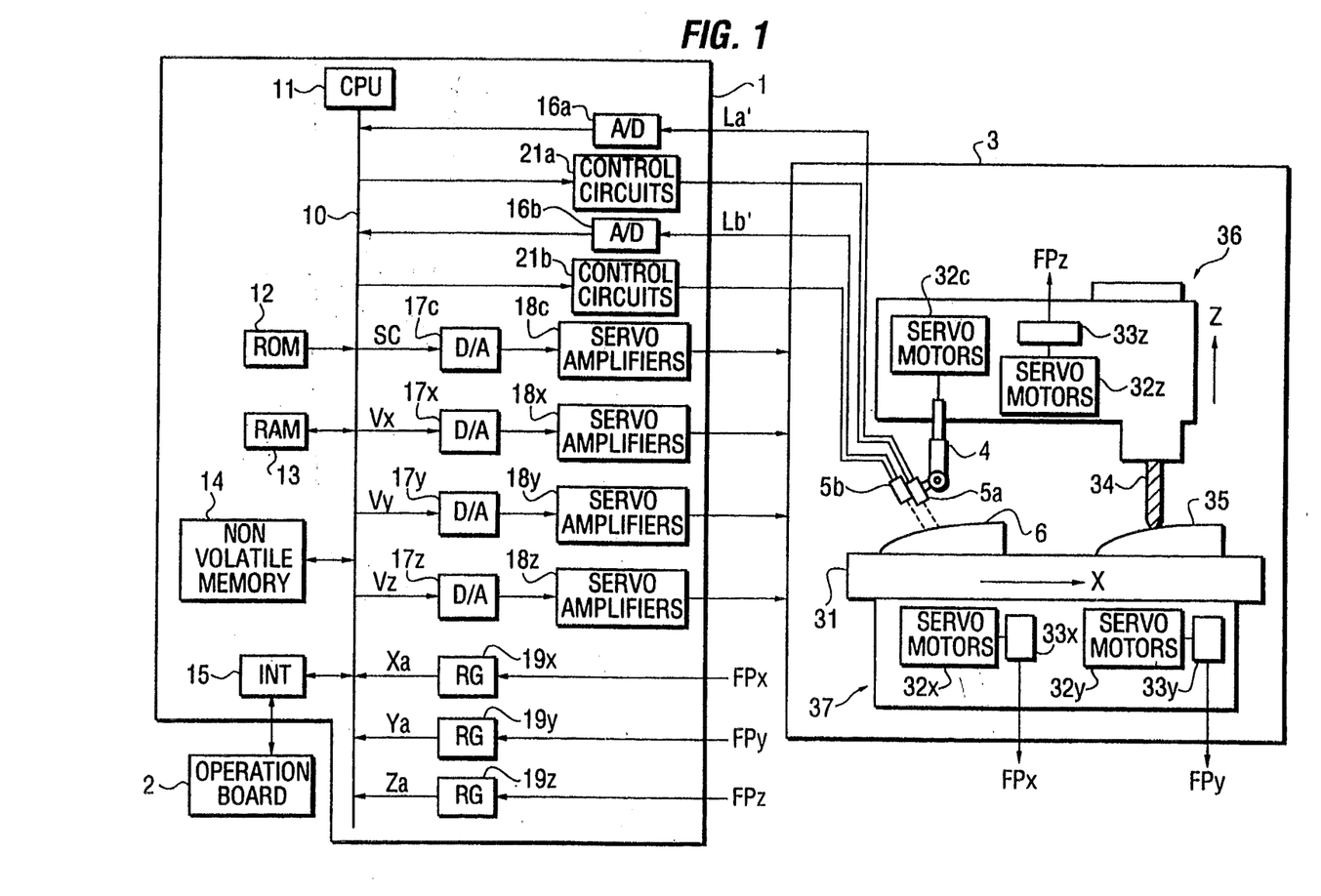
FIG. 1 is a schematic block diagram showing a non-contact profile control apparatus and a configuration of a machine tool, to which the profile control method in accordance with the preferred embodiment of the present invention.

Hereinafter, one embodiment of the present invention is explained with reference to the accompanying drawings. FIG. 1 is a schematic block diagram showing a non-contact profile control apparatus 1, by which one embodied method of the present invention is carried out, and a configuration of a machine tool 3, which is driven by the non-contact profile control apparatus 1.

The machine tool 3 consists of a work head portion 36 and a workpiece loading portion 37. The work head portion 36 comprises a main-shaft motor (not shown) and a Z-axis servomotor 32z. The main-shaft motor drives a cutting tool 34 such as an end mill, while the Z-axis servomotor 32z shifts the work head 36 up and down with respect to the workpiece loading portion 37.

On the other hand, the workpiece loading portion 37 comprises a table 31 on which a workpiece 35 and a model 6 used in the profile control are to be loaded. This table 31 can be shifted along respective directions of X-axis and Y-axis by use of X-axis servomotor 32x and Y-axis servomotor 32y.

A tracer head 4 is provided under the work head portion 36, extending downward from the lower surface of the work head portion 36 along a perpendicular direction (i.e. Z-axis) of the shifting plane (i.e. XY-plane) of the table 3. As a non-contact type distance sensor, a pair of optical distance sensors 5a and 5b (hereinafter, referred to as first and second distance sensors) is fixed on the distal end of the tracer head 4.

The non-contact profile control apparatus 1 includes a microprocessor 11 as a control means. The microprocessor 11 is connected through a bus 10 to a ROM 12, a RAM 13, a non-volatile memory 14, an interface 15 and the like. The ROM 12 stores various system programs for the drive control of the machine tool 3 and/or for the profile control by use of the tracer head 4. The RAM 13 temporarily stores control data such as distance values La' and Lb' measured by the first and second distance sensors 5a and 5b. The non-volatile memory 14 stores various parameters and/or various setting data such as those for determining the direction of the profile control and the shift speed of the table (i.e. the speed of the profile control). The interface 15 is associated with an operation board 2 so as to serve as a data input means.

The relationship between the non-contact profile control apparatus 1 and the machine tool 3 is as follows.

The microprocessor 11 outputs speed commands Vx, Vy, and Vz corresponding to X-, Y-, and Z-axes, respectively. These speed commands Vx, Vy, and Vz are inputted to servo amplifiers 18x, 18y, and 18z through D/A converters 17x, 17y, and 17z, respectively. The servomotors 32x, 32y, and 32z are driven in response to the output signals from the servo amplifiers 18x, 18y, and 18z, respectively.

Servomotors 32x, 32y, and 32z are equipped with pulse-coders 33x, 33y, and 33z, respectively, which generate feedback pulses FPx, FPy, and FPz at an interval corresponding to a predetermined rotation of each axes. These feedback pulses FPx, FPy, and FPz are inputted into present position registers 19x, 19y, and 19z which are provided for registering the present position of each axis.

On the other hand, these present position registers 19x, 19y, and 19z accumulatively add or subtract the feedback pulses FPx, FPy, and FPz to obtain current position data Xa, Ya, and Za. These current position data Xa, Ya, and Za are inputted to the microprocessor 11.

The microprocessor 11 outputs a detection command for every predetermined sampling period. This detection command is inputted to the distance sensors 5a and 5b through control circuits 21a and 21b. In response to this detection command, the distance sensors 5a and 5b carry out their detecting functions so as to obtain La' and Lb', respectively. These detected distance values La' and Lb' are inputted through A/D converters 16a and 16b to the microprocessor 11.

Every time these measured distance values La' and Lb' are inputted, the microprocessor 11 circularly stores at least the last two sampling results in the RAM 13 so that the values in the present position registers 19x, 19y, and 19z correspond, on a one-to-one-basis, to the present rotational position of the tracer head 4, i.e., the value in a present position register provided for the C-axis servomotor 32c.

Figure 2:
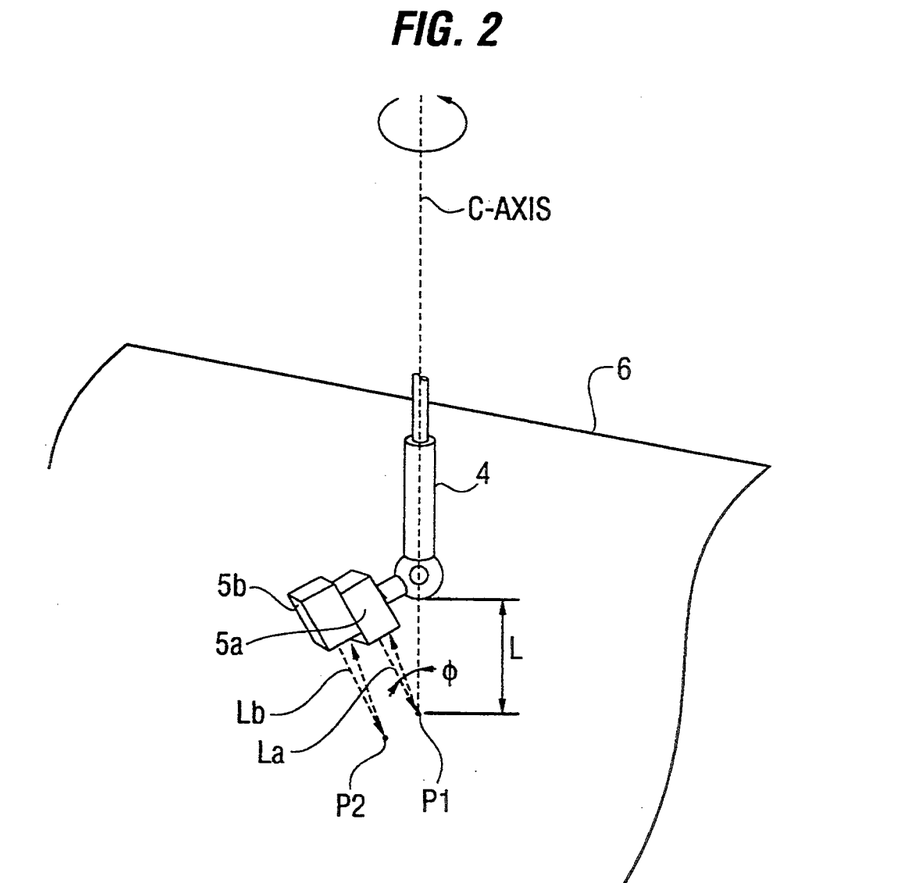
FIG. 2 is a perspective view schematically showing a tracer head used in the preferred embodiment shown in FIG. 1.

A rotation command sc for the tracer head 4 of the profile machine tool will be converted from digital data to analog data through a D/A converter 17c, and then supplied to a servo amplifier 18c. The servo amplifier 18c drives the servomotor 32c in accordance with this rotation command. 10 The first distance sensor 5a is secured on the tracer head 4 in such a manner that its irradiation beam axis (measuring beam axis) intersects the axis of the tracer head 4 at a predetermined angle Φ, as shown in FIG. 2. Furthermore, the second distance sensor 5b is fixed beside the first distance sensor 5a so that its irradiation beam axis becomes parallel with that of the first distance sensor 5a.

As will be described later, the first distance sensor 5a acts to maintain the distance (i.e. clearance) between the tip of the tracer head 4 and the model surface at a constant value by detecting the distance between the first distance sensor 5a and the model surface. The second distance sensor 5b detects an inclination of the measured plane on the model surface.

The tracer head 4 is driven by the servomotor 32C (FIG. 1) of C-axes to rotate about its axis. That is to say, the first and second distance sensors 5a and 5b can be rotated about the axis of the tracer head 4; i.e. the C-axis, together with the tracer head 4, with the measuring beam of each distance sensor maintaining the constant angle Φ with respect to the C-axis.

The C-axis is parallel with the Z-axis in the XYZ coordinates, and as described previously is perpendicular to the plane (i.e. the XY plane) of the table 31.

The tracer head 4, equipped with these distance sensors 5a and 5b, is integrally connected to the work head portion 36, so that this tracer head 4 can be shifted in the up-and-down direction together with the work head portion 36 by the Z-axis servomotor 32z, which has a function to shift the work head portion 36 as a whole in the up-and-down direction with respect to the workpiece loading portion 37.

With the Z-axis servomotor 32z, the Z-value representing the position of the tracer head 4 in the XYZ coordinates is feedback-controlled in such a manner that an intersection point (i.e. a point P1 of FIG. 2) of the measuring beam axis of the first distance sensor 5a and the axis of the tracer head 4 (i.e. C-axis) is a/ways positioned on the surface of the model 6.

As shown in FIG. 2, when the intersection point P1 is just positioned on the surface of the model 6, and a value La is obtained as a distance between the first distance sensor 5a and the intersection point P 1 based on the beam spot on the intersection point P1 formed by irradiating the surface of the model 6 with the beam from the first distance sensor 5a, this means that there is a clearance L along the Z-axis between the model surface and the distal end of the tracer head 4.

Therefore, the non-contact profile control can be realized by driving the Z-axis servomotor 32z so that the first distance sensor 5a always generates the value La. That is, at this condition, the clearance between the model surface and the distal end of the tracer head 4 can always be maintained constant at the value of L along the Z-axis as long as the first distance sensor 5a keeps generating the value La.

Next, as shown in FIG. 2, if the tracer head 4 is rotated 360 degrees about the C-axis, the irradiation direction (i.e. the direction of measuring beam axis) will be changed with respect to the surface of the model 6, although the position (i.e. point P1) of the beam spot will not be changed.

This will be explained briefly hereinafter with reference to FIG. 3. In the case where the C-axis and the measuring beam having an inclination angle Φ with respect to this C-axis are both on the XZ plane, the measuring beam can be either S1 or S2 in FIG. 3. An angle formed between a normal vector Vn of to the surface of the model 6 and the measuring beam axis S1 is α1, while an angle formed between the normal vector Vn and the measuring beam axis S2 is α2 (<α1). Thus the measuring beam axis S2 is closer to the perpendicular of the model surface than the other measuring beam axis S1.

Figure 3:
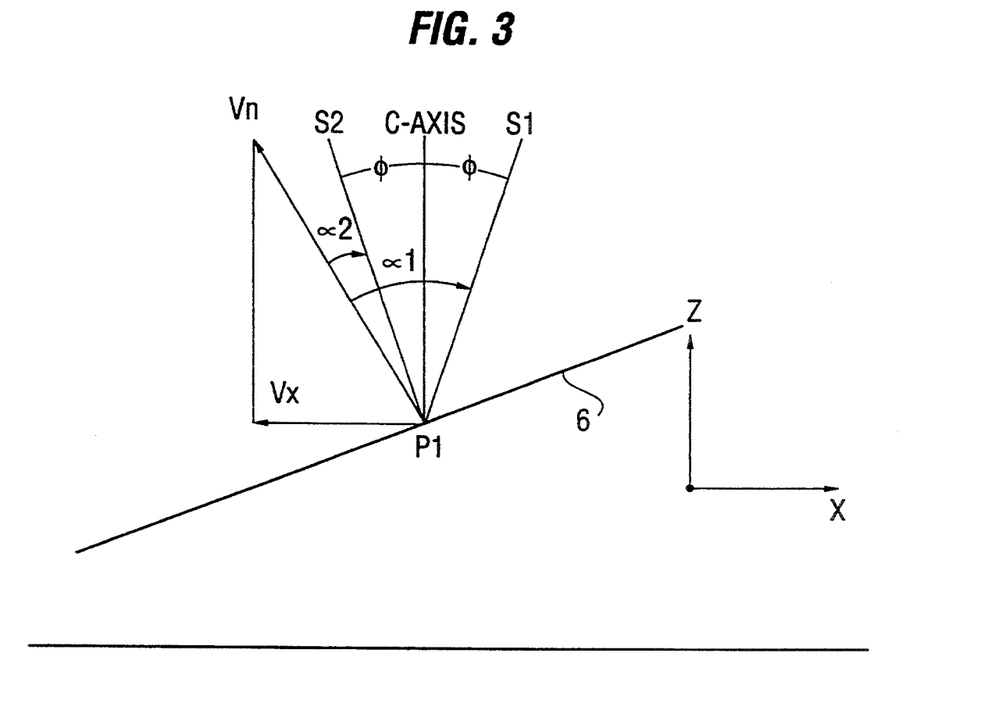
FIG. 3 is an explanatory view schematically showing how the angle between a detection beam axis of the distance sensor and the model surface changes depending on the rotational position of the distance sensor with respect to the C-axis.

Accordingly, in the case of the model 6 shown in FIG. 3, the positioning of the distance sensor is determined so that the measuring beam axis becomes S2 with respect to the C-axis. As a result, the beam spot on the model surface will take a shape close to a circle. Furthermore, in this case, the projection of the measuring beam axis S2 overlaps with the projection Vx of the normal vector Vn in the direction of the If this phenomenon is considered in terms of the XYZ three-dimensional coordinates, it is found that the rotational position (i.e. rotational angle) of the distance sensor with respect to the C-axis should be adjusted to satisfy the condition that the projection of the measuring beam axis and the projection of the normal vector to the model surface overlap with each other on the table shifting plane in order to have an incident angle of the beam coming out of the distance sensor set as close to the perpendicular of the model surface as possible, and to have a beam spot shaped as close to a circle as possible. With the configuration described above, the model 6 and the workpiece 35 are both loaded and fixed on the table 31. The table 31 and the work head 36 are set so that the distal end of the tracer head 4 approaches a trace start point on the model 6. The direction of the profiling control and the table shift speed (i.e. the speed of the profile control) etc. are inputted in the non-volatile memory 14 through the operation board 2; then, if a work start key (not shown) is manipulated, the microprocessor 11 initiates the profile control of the machine tool 3 in accordance with the control program stored in the ROM 12.

After the microprocessor 11 has once started the profile control, the microprocessor 11 generates the speed commands Vx and Vy, used in the control of the table 31 along the X-axis and Y-axis, on the basis of the profile control direction and the table shift speed having been set in the non-volatile memory 14. These speed commands Vx and Vy are supplied to the servomotors 32x and 32y through the D/A converters 17x and 17y and the servo amplifiers 18x and 18y. The servomotors 32x and 32y are driven in accordance with these speed commands Vx and Vy so as to shift the table 31 in the XY plane.

At the same time, the microprocessor 11 inputs the distance values La' and Lb' detected through the first and second distance sensors 5a and 5b in every predetermined sampling period. Then, the microprocessor 11 calculates a difference between a distance value La corresponding to the regular clearance L between the model 6 and the tracer head 4, and the distance value La' detected as a result of the present sampling through the first distance sensor 5a.

Then, thus calculated difference is converted into a distance along the C-axis (i.e. Z-axis) to obtain a positional deviation with respect to the regular clearance L. The speed command Vz of the Z-axis servomotor 32z is generated on the basis of this positional deviation, and is supplied to the Z-axis servomotor 32z through the D/A converter 17z and the servo amplifier 18z. The Z-axis servomotor 32z shifts the work head 36 in the up-and-down direction with respect to the table 37 in response to this speed command Vz, so that the clearance between the surface of the model 6 and the tracer head 4 can always be maintained to the regular value L. Thus, the cutting tool 34 can cut the workpiece 35 according to the same contour as the model 6.

In this case, the microprocessor 11 reads in precedent and present sampling data stored in the RAM 13 in every predetermined sampling period, i.e., distance values La' and Lb' detected through the first and second distance sensors 5a and 5b, values in the present position registers 19x, 19y, and 19z, a present rotational position of the tracer head 4 and offset data between the first and second distance sensors 5a and 5b and 10 so on are inputted to the microprocessor 11.

With these sampling data, four positions of the beam spots formed by the first and second distance sensors 5a and 5b in the precedent and present samplings are calculated in the XYZ coordinates. Then, an inclination (i.e. normal vector) to a plane determined by three of these four spatial position data, i.e., a very small plane including the beam spot by the first distance sen sot 5a, can be obtained.

After obtaining this normal vector, the microprocessor 11 generates the command sc, which is transmitted to the C-axis servomotor 32c through the D/A converter 17c and the servo amplifier 18c. In accordance with this command sc, the C-axis servomotor 32c drives the tracer head 4 to rotate about the C-axis until a direction of the projection of thus obtained normal vector becomes parallel with a direction of the projection of the measuring beam axis of the first distance sensor 5a on the XY plane of the table 31.

As a consequence, the measuring beam axes of the optical distance sensors 5a and 5b are always directed as close to the perpendicular to the model surface as possible, thereby enabling distance detection to be carried out at a high accuracy.

Here, how the normal vector to the model surface can be obtained by use of these first and second distance sensors 5a and 5b will be explained with reference to FIG. 4.

When it is assumed that the axis (C-axis) of the tracer head 4 is positioned as indicated by a chain double-dashed line in the drawing in the present sampling period, and that the positions of the beam spots on the surface of the model 6, irradiated by the first and second optical distance sensors 5a and 5b, are obtained in the XYZ coordinates as $Pa_n$(Xa, Ya, Za) and $Pb_n$(Xb, Yb, Zb), while the positions of the beam spots in the precedent sampling period are obtained as $Pa_{n-1}$(X$\alpha$, Y$\alpha$, Z$\alpha$) and $Pb_{n-1}$(X$\beta$, Y$\beta$, Z$\beta$), by choosing three (for example, $Pa_n$, $Pb_n$ and $Pa_{n-1}$) of these four position data, a very small plane including the point $Pa_n$ can be specified in the XYZ coordinates. Thus, in order to obtain the normal vector of this small plane, one vector connecting $Pa_n$ and $Pb_n$, i.e., a vector (Va) having connecting $Pa_n$ and Pa , i.e. a vector (Vb) having components components of (Xb-Xa, Yb-Ya, Zb-Za), and the other vector connecting $Pa_n$ and $Pa_{n-1}$, i.e., a vector (Vb) having components of (X$\alpha$-Xa, Y$\alpha$-Ya, Z$\alpha$-Za), have to be obtained so that the normal vector (V) of the very small plane can be calculated by the vector product of these two vectors Va and Vb.

When the normal vector V at the point Pa, which is the position of the beam spot by the first distance sensor 5a, the microprocessor 11 generates the rotation command sc to cause the tracer head 4 to rotate until it reaches an angle corresponding to the projection of the normal vector V on the XY plane of the table 31. That is to say, in the case where the X-component of the normal vector V is Vx, and the Y-component of the normal vector V is Vy, the rotational position 8(sc) measured from the X-axis is defined as follows:

$$\tan \theta(sc) = vy/vx$$

Accordingly, under the above-described condition, the first and second distance sensors 5a and 5b are rotated to direct their measuring beam axes as close to the perpendicular of the surface of the model 6 as possible. At the same time, the clearance between the surface of the model 6 and the tracer head 4 can be controlled in every predetermined period so that it is always maintained at the constant value (L). Therefore, the beam spot can periodically and adequately be detected. Thus, the distance detection can be performed with high accuracy, and an accurate profile control can be realized.

The first distance sensor 5a (and also the second distance sensor 5b) used in the above profile control is an ordinary optical distance sensor consisting of an irradiation means such as a semiconductor laser or a light emitting diode and a light receiving element such as a CCD. A distance from the sensor to the beam spot on the model 6 is obtained on the basis of position data of the reflected beam received on the light receiving element and an irradiation angle of the beam coming out of the sensor.

Thus, if the surface of the model 6 has a steep change, the beam spot may not be formed in the detection area within which the distance sensor can perform the detecting function normally, or the shape of the beam spot may have a widely elongated elliptic shape even if the beam spot is formed within the detection area, and this ends up with the fall of the resolution of the distance sensor.

Figure 4:
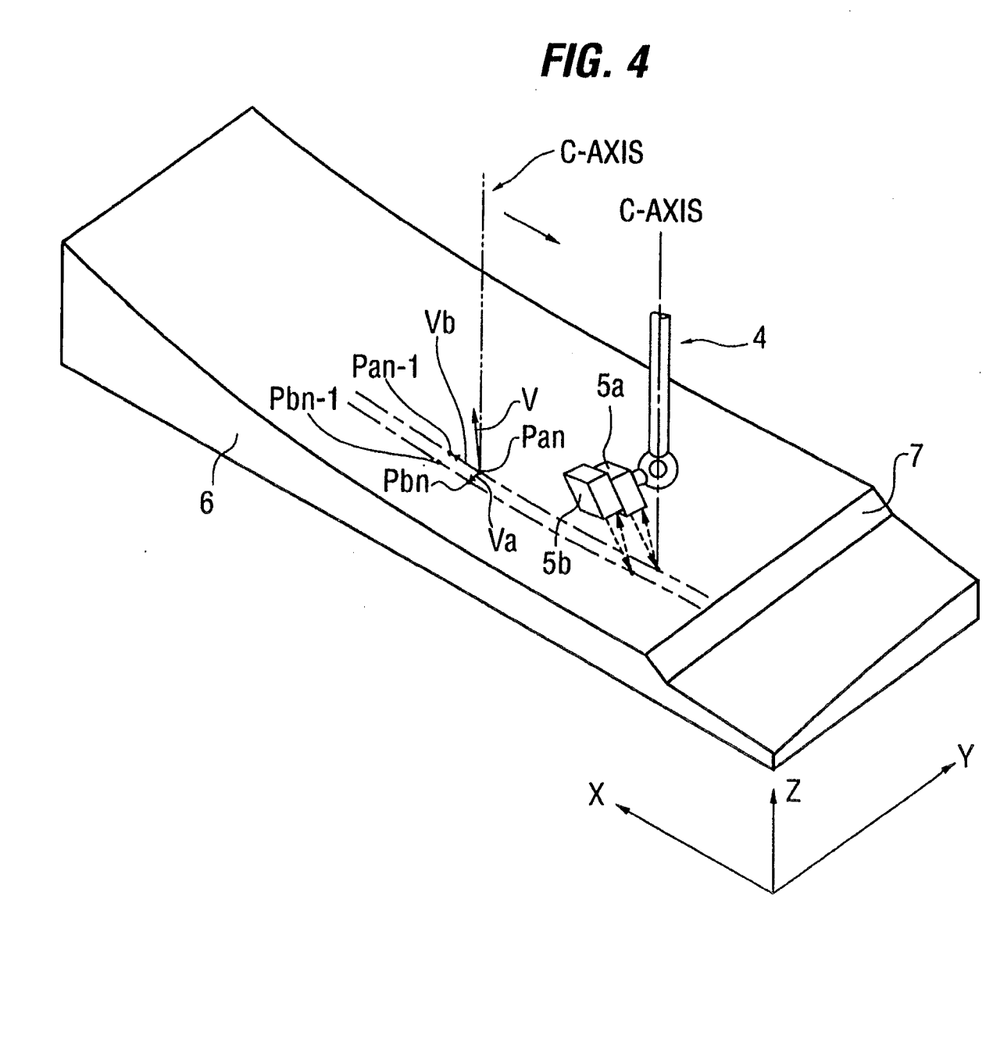
FIG. 4 is a perspective view showing one example of the profile control executed on a model whose contour has a steep change.
Figure 5A:
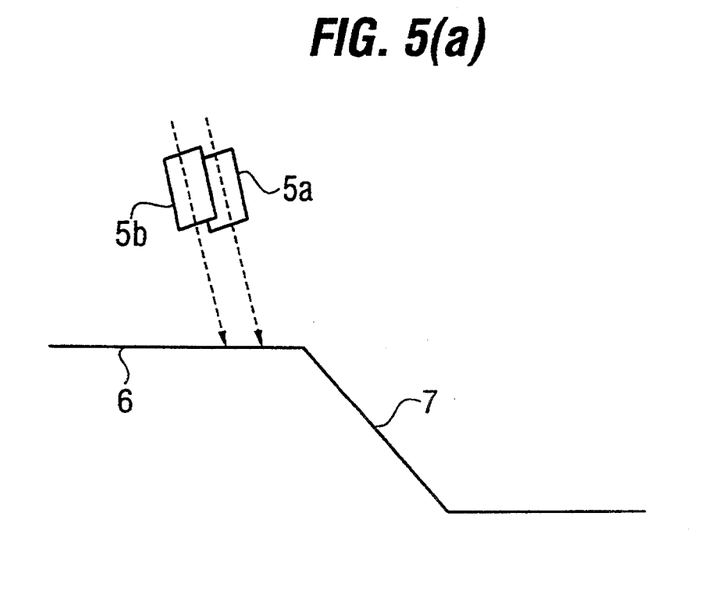
FIG. 5(a) and FIG. 5(b) are views showing conditions before and after the detection beam of each of a first and a second distance sensor passes over an edged portion formed on the model surface.
Figure 5B:
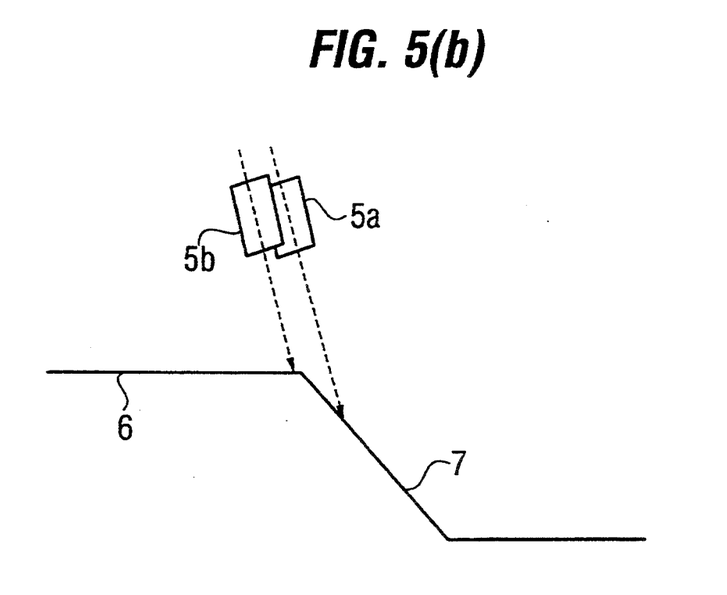

For example, if the surface of the model 6 has a steep slope 7, as shown in FIG. 4, the distance between the distance sensor and its beam spot is greatly different before and after the distance sensor passes over the steep slope. Namely, the distance from the first distance sensor 5a to its beam spot is suddenly changed between a condition where the first and second distance sensors 5a, 5b do not reach the steep slope 7 (refer to FIG. 5(a)) and another condition where the first distance sensor 5a is passing over the steep slope 7 (refer to FIG. 5(b)). Thus, the distance in the latter condition may exceed a maximum distance up to which the distance sensor 5a can perform its detecting function. In such a case, it becomes impossible to feedback-control the distance between the model surface and the tracer head 4 to the specified value L, and this sometimes compels the profile control to be interrupted within the area of this steep slope 7.

According to the embodiment of the present invention, for every predetermined sampling period, it is checked whether or not a dark alarm is generated from the first distance sensor 5a which directly relates to the profile control. The dark alarm is 10 a signal indicating a condition in which the first distance sensor 5a cannot detect the distance.

If the dark alarm is detected, the rotational position control of the tracer head 4 and the control of respective axes for the profiling work are stopped once. Then, the processing for recovering the position detecting function of the first distance sensor 5a is executed so that the position of the beam spot on the model 6 can be resettled within the detection area of the first distance sensor 5a.

When only the second distance sensor 5b has become unable to detect the position of the object, the profile control can be continued by calculating the normal vector on the basis of the precedent sampling data obtained before the dark alarm is generated.

Figure 6:
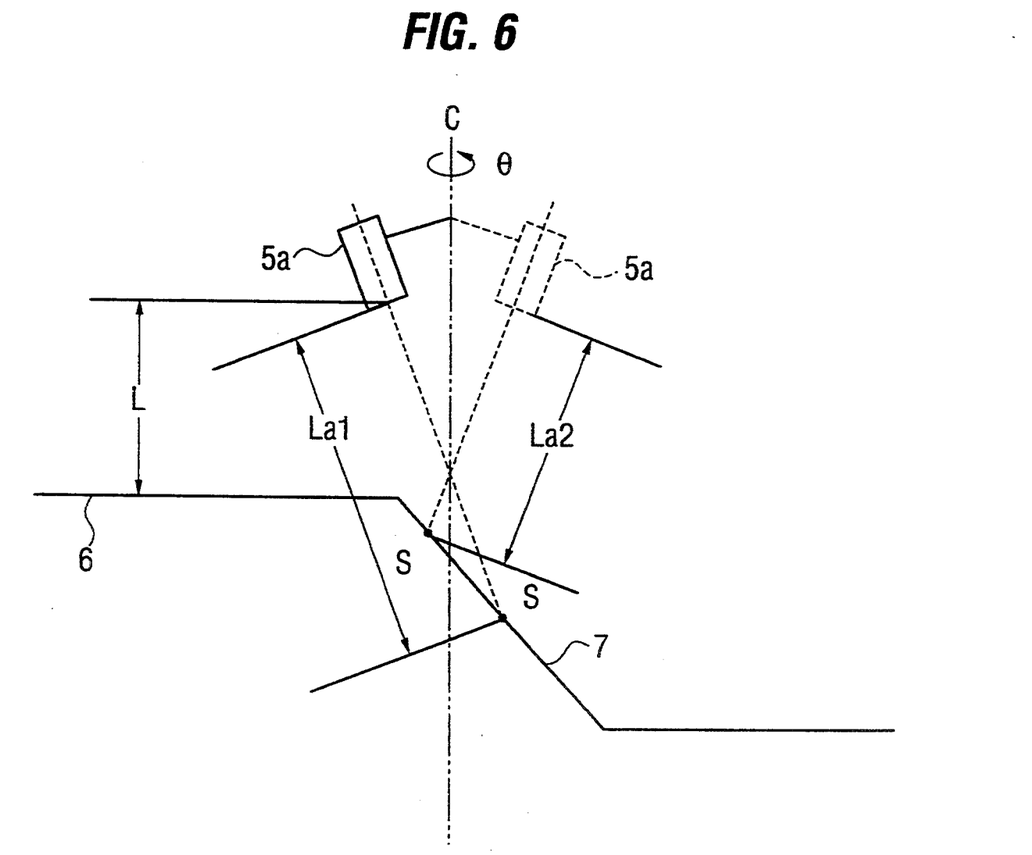
FIG. 6 is an explanatory view schematically showing that the distance between the distance sensor and the model surface can be detected when the distance sensor is rotated about the C-axis by a predetermined angle after the distance sensor has passed over the edged portion.

The principle of the present embodiment will be explained with reference to FIG. 6. A distance sensor 5a indicated by a solid line in FIG. 6 is the same as the first distance sensor 5a positioned in a condition shown in FIG. 5(b). A distance $La_1$ between the first distance sensor 5a and the beam spot S is out of the detection area of the first distance sensor 5a. At this position, the rotational axis (C-axis) of the tracer head 4 is rotated by an amount of 8, so that the distance sensor 5a is relocated from the position indicated by the solid line to another position indicated by a dotted line in FIG. 6.

As a result, an angle formed between the measuring beam axis of the distance sensor 5a and the surface of the steep slope 7 becomes closer to the right angle. Thus, a distance from the distance sensor 5a to a beam spot S' is $La_2 (<La_1)$, which comes within the detection area.

Next, the table 31 is shifted in the XY plane with respect to the distance sensor 5a so that this distance $La_2$ becomes almost equal to the distance $La$ corresponding to the clearance L predetermined in the profile control. The direction of this shift is the same as the projection of the measuring axis of the first distance sensor 5a on the XY plane. In FIG. 6, the table 31 (i.e. the model 6) is shifted toward the right with respect to the distance sensor 5a shown by the dotted line. Thus, the clearance becomes very close to L. Then, at this position, the profile control, which has been interrupted, can be restarted. After this, the clearance between the distance sensor 5a and its beam spot can readily be held to the specified clearance L.

Figure 7:
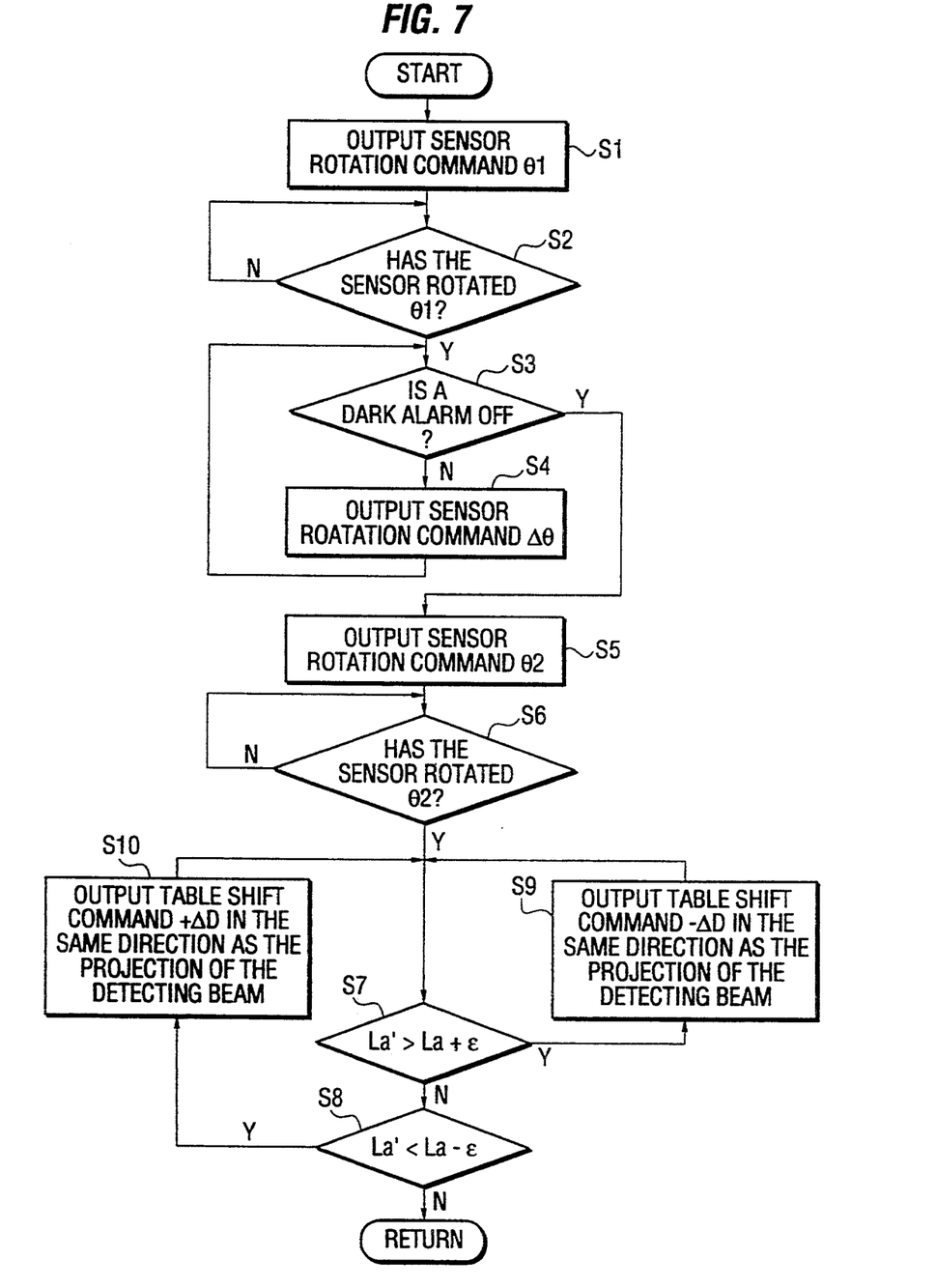
Figure 8:
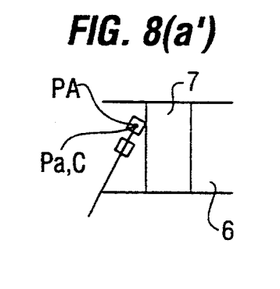
Figure 8A:
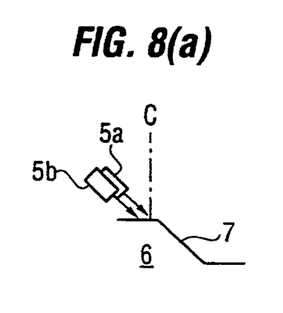

FIG. 7 is a flowchart showing the procedure that the microprocessor 11 executes in accordance with a program of the position detecting function recovery processing, which is stored in the ROM 12. Now, the processing operation of the present invention will be explained with reference to the flowchart in FIG. 8.

In the discrimination processing during every predetermined sampling period, if it is detected that the dark alarm is generated from the first distance sensor 5a, the microprocessor 11 stops the drive control of respective axes to hold the rotational positions of respective axes to the present positions. Then, the microprocessor 11 outputs a rotation command for a predetermined amount to the C-axis servomotor 32c irrespective of the presence of the dark alarm signal. (Step S1)

Figure 8B:
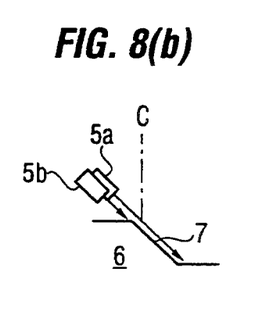

FIG. 8(a) and FIG. 8(a') show the normal profile control condition, while FIG. 8(b) and FIG. 8(b') show the condition where the dark alarm has just been generated. As can be seen from FIG. 8(b'), the first distance sensor 5a forms its beam spot Pa far from the C-axis. Accordingly, the incident beam from this spot Pa cannot enter into a detection area PA of the detection element such as a CCD equipped in the first distance sensor 5a. As a consequence, the distance cannot be detected. (In other words, the dark s/arm cannot be canceled.)

Then, the rotations/axis (C-axis) of the tracer head 4 is rotated by a predetermined amount 81 (Step S2).

Figure 8C:
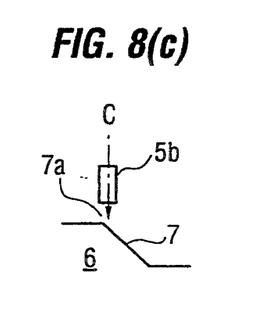

In accordance with this rotation, the inclination of the measuring beam axis with respect to the steep slope 7 is gradually changed. FIG. 8(c) and 8(c') show a condition after the tracer head 4 has been rotated by the amount of the angle $\theta 1$ from the position indicated by FIG. 8(b) and 8(b'). As shown in FIG. 8(c'), the beam spot Pa of the first distance sensor 5a fairly approaches the C-axis in this instance, but not so close as to be detected by the light receiving element equipped in the distance sensor 5a.

In order to be practical, the amount of this angle $\theta 1$ should be large enough, or about 90 degrees, so that repetition of generating and ceasing of an dark s/arm will not be done unnecessarily when the irradiation beam from the distance sensor 5a or the incident beam from the beam spot is partially intercepted by the edge of the slope 7 (because of the unevenness of the edge surface which can be recognized if observed closely.)

After rotating the first and second distance sensors 5a and 5b by the predetermined amount $\theta 1$, the microprocessor 11 judges whether or not the dark s/arm of the first distance sensor 5a is turned off (Step S3).

If the dark alarm is not turned off, the microprocessor 11 outputs a very small rotation command $\Delta \theta$ to the C-axis servomotor 32c to give the tracer head 4 another rotation (Step S4), and the microprocessor 11 waits until the dark alarm is turned off by the processing of steps S3.

Figure 8D:
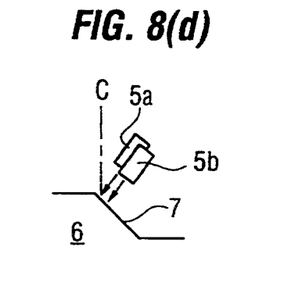

If these steps S3 and S4 are repeated k times, a total rotation angle of the tracer head 4 becomes [$\theta 1 + k \cdot \Delta \theta$] degrees. As a result, as shown in FIG. 8(d) and 8(d'), the beam spot PA of the first distance sensor 5a will become able to be formed in the vicinity of the C-axis at an upper portion of the slope 7. Thus, the beam spot will become able to be detected by the detection element in the first distance sensor 5a. As a consequence, the dark alarm from the first distance sensor 5a is turned off.

After detecting in the step S3 that the dark alarm is turned off, the microprocessor 11 outputs another predetermined rotation command to the C-axis servomotor 32c (Step S5) to cause the rotational axis (C-axis) of the tracer head 4 to be further rotated by a predetermined amount $\theta 2$ from the rotational position where the dark alarm has just turned off.

Figure 8E:
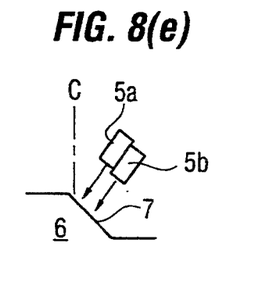

This additional rotation by the angle $\theta 2$ is required, because the rotational position of the C-axis at the time when the dark alarm has just been turned off corresponds to a position where the distance sensor 5a has just recovered from the disabled condition to the normal condition, being generally not the position where the clearance between the distance sensor 5a and the model surface is closest to La corresponding to the specified clearance L. Therefore, it is required that the C-axis be further rotated by the predetermined amount ($\theta 2$) from this rotational position, so as to bring the clearance close to the distance La. In the condition shown in FIGS. 8(e) and 8(e'), the beam spot Pa is formed very close to the C-axis. By the way, the angle $\theta 2$ would be generally chosen to be approximately 45 degrees.

Under this condition, however, the distance between the beam spot and the distance sensor 5a is not always within a certain range (i.e. a tolerance range) in which the clearance can stably be controlled to the specified value L in executing the profile control.

Therefore, after finishing the processing of the step S6, the microprocessor 11 adjusts the clearance between the distal end of the tracer head 4 and its beam spot to make it as close to clearance L as possible in order to stabilize the operation of 10 the tracer head 4 after the profile control is resumed.

That is, the table 31 is shifted with respect to the tracer head 4 (i.e. C-axis) in the same direction as the direction in which the measuring beam of the first distance sensor 5a is projected on the profiling plane (i.e. on the XY plane).

More particularly, after finishing the judgement processing of the step S6, the microprocessor 11 receives the detected distance value La from the first distance sensor 5a and subsequently judges whether or not this detected distance value La is between an allowable upper limit value (La+E) and an allowable lower limit value (La−E). (Steps S7 and S8)

If the detected distance value La is out of the tolerance range, the table 31 is shifted with respect to the tracer head 4 in the same direction as the direction in which the measuring beam of the first distance sensor 5a is projected on the profiling plane. (Steps S9 and S10)

Then, if the detected distance value La' from the first distance sensor 5a is within the tolerance range (La−E<La'<La+E) as a result of the shifting of the table 31 with respect to the tracer head 4, the processing shown in this flowchart is ended, and the profile control, which has been interrupted, will be resumed.

The predetermined angles $\theta 1$ and $\theta 2$ of the tracer head 4 used in the steps S2 and S5 can be determined optionally in accordance with the contour of the model 6.

Furthermore, instead of above-described processing, the position detecting function recovery processing can be also realized in the following manner.

After the rotational position control of the tracer head 4 and the respective axes control for the profiling work have been once interrupted, the tracer head 4 is forcibly rotated to cause one complete 360-degree rotation. During this one complete 360-degree rotation, it is checked at an interval of a predetermined angle whether or not the dark alarm is generated from the first distance sensor 5a. And, an angle section, during which the dark alarm is continuously turned off, is obtained. Then, a midpoint angle between the initiation point and the termination point of this angle section is obtained as a position where the beam receiving condition of the distance 5a will be most stabilized. Thereafter, the tracer head 4 is again rotated until it reaches this midpoint angle. Then, the processing from the step S7 is carried out in the same manner as the previous case. In this case, it is not necessary to determine the rotational angles $\theta 1$ and $\theta 2$ of the tracer head 4.

Moreover, above-described embodiment uses, as the non-contact type distance sensor, the type of sensor which forms the spot on the model surface to detect it optionally. However, needless to say, the non-contact type distance sensor used in the present invention can be either the distance detector that measures reflected light quantity or the distance sensor utilizing the triangular measuring method. Besides, other distance detection means such as the eddy-current detector, supersonic type distance sensor, etc. can also be employed as the non-contact type distance sensor for the present invention.

We claim:

1. A non-contact profiling method for tracing a surface of a model using a non-contact distance sensor rotatably mounted on a supporting shaft extending vertically with respect to a table supporting the model, said distance sensor having a distance detecting function for contactlessly measuring a distance to the surface of the model, said method comprising the steps of:
    (a) performing a non-contact profiling operation including rotational position control of said distance sensor for controlling a rotational position of said distance sensor with respect to said supporting shaft;
    (b) stopping said contactless profiling including rotational position control if said distance detecting function fails;
    (c) rotating said distance sensor about said vertical supporting shaft until said distance sensor recovers said distance detecting function; and
    (d) resuming said contactless profiling including rotational position control.

2. A non-contact profiling method as recited in claim 1, wherein said rotating step (c) comprises the steps of:
    (c1) rotating said distance sensor about said vertical supporting shaft by a first predetermined amount to a first position;
    (c2) performing fine adjustment rotation by rotating said distance sensor about said vertical supporting shaft by a second predetermined amount, smaller than said first predetermined amount, at successive predetermined intervals until said distance sensor recovers said distance detecting function; and (c3) stopping said fine adjustment rotation when said distance sensor has recovered said distance detecting function.

3. A non-contact profiling method as recited in claim 1, wherein said rotating step (c) comprises the steps of:
(c1) rotating said distance sensor about said vertical supporting shaft by a first predetermined amount;
(c2) performing fine adjustment rotation by rotating said distance sensor by a second predetermined amount, smaller than said first predetermined amount, at successive predetermined intervals until said distance sensor recovers said distance detecting function; and
(c3) performing a rotation of said distance sensor about said vertical supporting shaft by a third predetermined amount.

4. A non-contact profiling method as recited in claim 1, wherein said rotating step (c) comprises the steps:
(c1) rotating said distance sensor by 360 degrees;
(c2) during said 360 degree rotation, determining a first angle at which said distance detecting function changes from failed to recovered;
(c3) during said 360 degree rotation, determining a second angle at which said distance detecting function changes from recovered to failed; and
(c4) adjusting the rotational position of said distance sensor at a mid-point between said first and second angles.

5. A non-contact profiling method as recited in claim 1, wherein said distance sensor includes a first distance sensor obtaining a regular clearance and a second distance sensor cooperating with said first distance sensor to detect an inclination of the surface of said model, and the rotational position of said distance sensor is adjusted in response to said inclination of the model surface during the profiling operation.-IN 6. A non-contact profiling method for tracing a surface of a model using a non-contact distance sensor rotatably mounted on a supporting shaft extending vertically with respect to a table supporting the model, said distance sensor having a distance detecting function for contactlessly measuring a distance to the surface of the model, said method comprising the steps of:
(a) performing a non-contact profiling operation including rotational position control of said distance sensor for controlling a rotational position of said distance sensor with respect to said supporting shaft;
(b) stopping said contactless profiling including rotational position control if said distance detecting function fails;
(c) rotating said distance sensor about said vertical supporting shaft until said distance sensor recovers said distance detecting function;
(d) shifting said table with respect to said distance sensor to adjust the clearance of the distance sensor from said model to a predetermined value after said distance sensor has recovered said distance detecting function; and
(e) resuming said contactless profiling including rotational position control.

7. A non-contact profiling method as recited in claim 6, wherein said table is shifted with respect to said distance sensor in a direction parallel to a direction in which a measuring beam of said distance sensor is projected on a plane along which said table shifts.

8. A non-contact profiling method as recited in claim 7, wherein said distance sensor is a distance detector that measures reflected light quantity.

9. A non-contact profiling method as recited in claim 7, wherein said distance sensor is an optical distance detector that measures reflected light quantity.

10. A non-contact profiling method as recited in claim 7, wherein said distance sensor is an eddy-current type distance detector.

11. A non-contract profile control method as recited in claim 7, wherein said distance sensor is a supersonic type distance detector.

* * * * *

UNITED STATES PATENT AND TRADEMARK OFFICE
CERTIFICATE OF CORRECTION

PATENT NO. : 5,426,356

DATED : June 20, 1995

INVENTOR(S) : Hitoshi MATSUURA et al.

It is certified that error appears in the above-indentified patent and that said Letters Patent is hereby corrected as shown below:

Column 3,   line 25, delete "10".

Column 5,   line 42, delete "10"; and after "command.", insert a paragraph break.

Column 6,   line 12, change "a/ways" to --always--.

Column 7,   line 54, delete "10".

Column 8,   line 45, change "8(sc)" to --$\Theta$(sc)--.

Column 9,   line 33, delete "10";
                  line 53, change "$La_1$between" to --$La_1$ between--;
                  line 57, change "8" to --$\Theta$--.

Column 10, line 37, change "s/arm" to --alarm--;
                  line 39, change "rotations/axis" to --rotational axis--;
                  line 40, change "81" to --$\Theta 1$--;
                  line 53, change "s/arm" to --alarm--;
                  line 61, change "s/arm" to --alarm--.

UNITED STATES PATENT AND TRADEMARK OFFICE
CERTIFICATE OF CORRECTION

PATENT NO. : 5,426,356
DATED : June 20, 1995
INVENTOR(S) : Hitoshi MATSUURA et al.

It is certified that error appears in the above-indentified patent and that said Letters Patent is hereby corrected as shown below:

Column 11, line 15, change "82" to --$\Theta 2$--;
line 17, change "82" to --$\Theta 2$--;
line 42, delete "10";
line 67, change "81" to --$\Theta 1$--; and change "82" to --$\Theta 2$--.

Column 12, line 24, change "81" to --$\Theta 1$--; and change "82" to --$\Theta 2$--.

Column 13, line 36, delete "-IN".

Signed and Sealed this

Twenty-first Day of November, 1995

Attest:

BRUCE LEHMAN

Attesting Officer     Commissioner of Patents and Trademarks